Feb. 7, 1950 F. A. COLE 2,496,700
KNOB ASSEMBLY
Filed Aug. 16, 1946
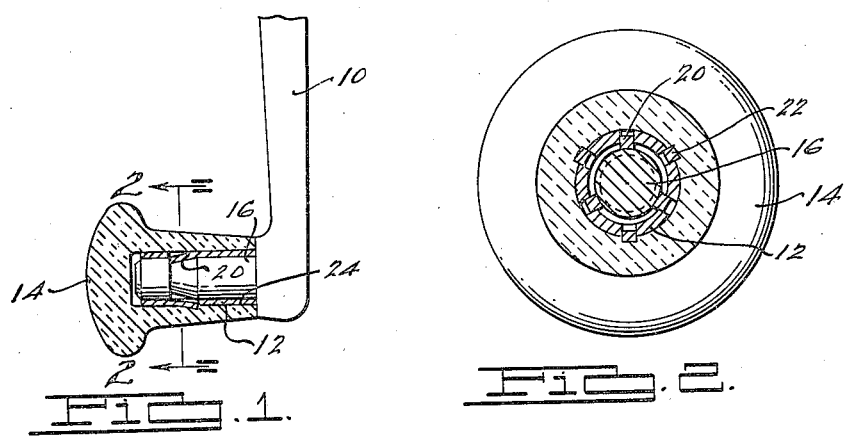
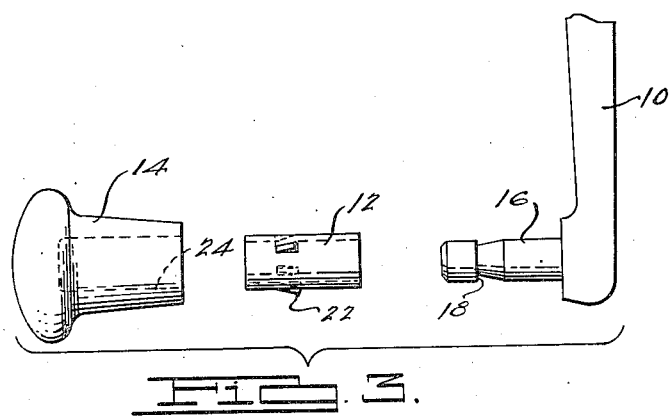
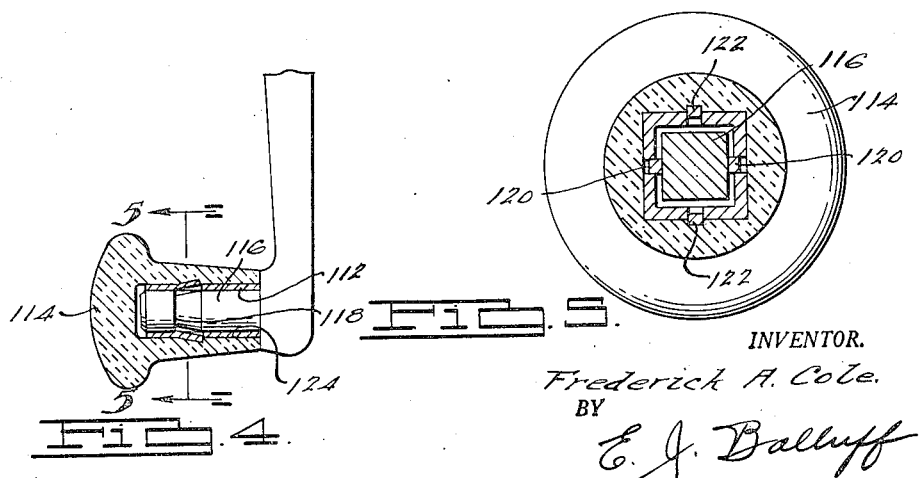
INVENTOR.
Frederick A. Cole.
BY
E. J. Balluff
ATTORNEY.

Patented Feb. 7, 1950

2,496,700

UNITED STATES PATENT OFFICE 2,496,700

KNOB ASSEMBLY

Frederick A. Cole, Detroit, Mich.

Application August 16, 1946, Serial No. 690,912

6 Claims. (Cl. 74—543)

This invention relates to knob or handle assemblies and has particular reference to a new and improved arrangement whereby a plastic knob may be secured in an inexpensive manner to a shaft or stem.

It is customary now to secure plastic knobs to their supporting stems by inserting such stems in the mold and casting the knob around the stem in order to secure the knob thereto. This has proven to be relatively expensive due to the fact that the output of the machine when so employed is materially limited. My invention contemplates a simple and inexpensive arrangement by which knobs and the like may be secured to their shafts.

Principal objects of the invention, therefore, are to provide:

A new and improved knob assembly and the like;

A knob assembly which is inexpensive to make and assemble.

Other and further objects of the invention will be apparent from the following description and claims and will be understood by reference to the accompanying drawing, of which there is one sheet, which, by way of illustration, shows preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings

Fig. 1 is a sectional view of a knob assembly embodying the invention;

Fig. 2 is an enlarged sectional view taken on the line 2—2 of Fig. 1;

Fig. 3 is an exploded view of the parts of the knob assembly shown in Figs. 1 and 2;

Fig. 4 is a sectional view of a modified form of the invention; and

Fig. 5 is an enlarged sectional view taken along the line 5—5 of Fig. 4.

While the invention has particular reference to knob assemblies, it may be used in connection with other assemblies wherein it is desired to secure a plastic part to another piece. As illustrated in Figs. 1, 2 and 3, the knob or handle assembly comprises a crank 10, a hollow tubular member 12, and a handle or knob member 14. The crank 10 has an arm or shaft 16 which in turn is provided with a shoulder 18. The shoulder 18 may be formed by an annular peripheral groove in the arm 16. The hollow tubular member 12 may be formed of metal or other suitable material and is provided with one or more inwardly deflected prongs or tangs 20 and one or more outwardly deflected prongs or tangs 22.

The inwardly deflected prongs 20 as shown in Fig. 1 are engageable with the shoulder 18 so as to prevent relative axial movement in one direction between the member 12 and the arm 16. A handle or knob member of plastic material is provided with a socket 24 in which the hollow member 12 with the arm 16 assembled therein is fitted.

The outwardly deflected prongs 22, of which there may be three, are arranged opposite to the inwardly deflected prongs 20 and are engageable with the wall of the socket 24 to prevent separation of the hollow tubular member 12 from the handle member 14. The outwardly deflected prongs 22 may be arranged alternately with respect to the inwardly deflected prongs 20 of which there may be three. The prongs 20 and 22 have a certain amount of resiliency so as to permit the member 12 to be telescoped on the arm 16 and inserted in the socket 24. The outwardly deflected prongs 22 will dig into or at least partially embed themselves in the wall of the socket 24 as illustrated in Fig. 1, and thereby prevent the separation of the member 12 from the socket in the knob 14.

As the cross section of the arm 16 and the interior of the member 12 are circular, the knob and the member 12 will be free to rotate relative to the arm 16. The knob 14 may comprise a molded plastic piece and the socket 24 therein may be formed without any undercuts or enlargements therein; that is, the socket is cylindrical in form and is characterized by the absence of inwardly facing shoulders or ledges.

The tubular member 12 is constructed so that it may be assembled and secured to the shaft 16 by inserting the shaft in the tubular member to an extent sufficient to permit the inwardly deflected tangs to engage the shoulder 18 on the shaft and so that the tubular member may be assembled to the plastic member 14 by inserting the tubular member in the socket 24 to an extent sufficient to permit the outwardly deflected tangs to engage the walls of the socket.

In the modification shown in Figs. 4 and 5, the construction is essentially the same except that the arm 116 and the hollow member 112 are non-circular in cross section so as to prevent rotation between the knob 114 and its supporting arm 116. The hollow member 112, like the member 12, is provided with inwardly and outwardly deflected prongs 120 and 122 which engage the inner wall of the socket 124 and the shoulder 118 on the arm 116 so as to secure the knob 114 on the arm 116.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A handle assembly of the class described comprising a crank arm having a shoulder arranged transversely of the axis thereof and facing toward the inner end of said arm, a hollow tubular member telescoped on said arm and having integral radially inwardly deflected prongs engageable with said shoulder by telescoping said tubular member on said arm so as to prevent relative axial movement in one direction between said member and arm, a handle knob member of plastic material having a socket in which said hollow member with the arm assembled therein is fitted, said hollow member having integral radially outwardly deflected prongs arranged oppositely to the aforesaid prongs and engaging the wall of said socket to prevent separation of said hollow tubular member therefrom, and means preventing relative axial movement in a direction opposite to said one direction between said arm and handle member.

2. A handle assembly according to claim 1 wherein said arm and the interior of said hollow tubular member are circular in cross section and wherein said shoulder is formed by an annular peripheral groove in said arm so that said hollow tubular member is free to rotate relative to said arm and forms a bearing surface for said knob.

3. A handle assembly according to claim 1 wherein said arm and the interior of said hollow tubular member are non-circular in cross section so as to prevent relative rotation therebetween.

4. An assembly of the class described comprising a shaft having a shoulder arranged transversely of the axis thereof and facing toward one end of said shaft, a hollow tubular means telescoped on said shaft and having an inwardly deflected prong engageable with said shoulder by telescoping said tubular means on said shaft so as to prevent relative axial movement in one direction between said means and shaft, a member of plastic material having a socket in which said hollow means with the shaft assembled therein is fitted, said hollow means having an outwardly deflected prong arranged oppositely to the aforesaid prong and engaging the wall of said socket to prevent separation of said hollow tubular member from said socket, said shoulder being formed by a peripheral groove so that said hollow means is free to rotate relative to said shaft.

5. An assembly according to claim 4 wherein said member in which said socket is formed comprises a single molded piece characterized by the absence of inwardly facing shoulders or ledges.

6. An assembly of the class described comprising a shaft having a peripheral groove forming a shoulder arranged transversely of the axis thereof and facing toward one end of said shaft, a hollow tubular member telescoped on said shaft and having inwardly deflected tangs engageable with said shoulder so as to prevent relative axial movement in one direction between said member and shaft, a handle member of plastic material having a socket in which said hollow member with the shaft assembled therein is fitted, said hollow member having outwardly deflected tangs engaging the wall of said socket to prevent separation of said hollow tubular member from said socket, said tubular member being constructed so that it may be assembled and secured to said shaft by inserting said shaft in said tubular member to an extent sufficient to permit said inwardly deflected tangs to engage said shoulder on said shaft and so that such tubular member may be assembled to said plastic handle member by inserting said tubular member in said socket to an extent sufficient to permit said outwardly deflected tangs to engage the wall of said socket, said tubular member being rotatable about said shaft.

FREDERICK A. COLE.

REFERENCES CITED

The following references are of record in the file of this patent:

UNITED STATES PATENTS

| Number | Name | Date |
|---|---|---|
| 1,409,142 | Gerson | Mar. 7, 1922 |
| 1,515,164 | Norwood | Nov. 11, 1924 |

FOREIGN PATENTS

| Number | Country | Date |
|---|---|---|
| 27,124 A. D. 1909 | Great Britain | Sept. 1, 1910 |
| 368,242 | Italy | Feb. 11, 1939 |
| 127,841 | Switzerland | Sept. 14, 1924 |